United States Patent
Komukai et al.

(10) Patent No.: US 10,207,920 B2
(45) Date of Patent: Feb. 19, 2019

(54) STRUCTURE FOR HOLDING CATALYST PARTICLES FOR CARBON NANOTUBE PRODUCTION AND METHOD FOR PRODUCING SAME

(71) Applicant: NITTA Corporation, Osaka (JP)

(72) Inventors: Takuji Komukai, Osaka (JP); Yutaka Shimomoto, Osaka (JP); Hiromi Teruhira, Osaka (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 15/507,649

(22) PCT Filed: Jul. 29, 2015

(86) PCT No.: PCT/JP2015/071517
§ 371 (c)(1),
(2) Date: Feb. 28, 2017

(87) PCT Pub. No.: WO2016/035484
PCT Pub. Date: Mar. 10, 2016

(65) Prior Publication Data
US 2017/0283264 A1    Oct. 5, 2017

(30) Foreign Application Priority Data
Sep. 1, 2014 (JP) .................... 2014-177265

(51) Int. Cl.
*C22C 21/02* (2006.01)
*B82Y 40/00* (2011.01)
(Continued)

(52) U.S. Cl.
CPC ............. *B82Y 40/00* (2013.01); *B01J 21/185* (2013.01); *B01J 23/745* (2013.01);
(Continued)

(58) Field of Classification Search
CPC .... B01J 21/185; B01J 23/745; B01J 37/0207; B01J 37/08; B32B 1/08; C01B 31/0233;
(Continued)

(56) References Cited

U.S. PATENT DOCUMENTS 1,732,915 A * 10/1929 Saklatwalla .............. C21C 7/06
420/578
7,235,159 B2 * 6/2007 Gu ........................... B01J 23/24
204/192.1
(Continued)

FOREIGN PATENT DOCUMENTS

EP       1059266 A2    12/2000
JP    2007117881 A     5/2007
(Continued)

OTHER PUBLICATIONS

Extended European Search Report for application No. 158373985 dated Jan. 16, 2018.
(Continued)

*Primary Examiner* — Patricia L. Hailey
(74) *Attorney, Agent, or Firm* — Fox Rothschild LLP; Robert J. Sacco; Carol E. Thorstad-Forsyth

(57) ABSTRACT

There are provided an easily producible catalyst particle-holding structure used for production of carbon nanotubes, and a method for producing the same. The method for producing the catalyst particle-holding structure of the present invention used for production of carbon nanotubes includes a step of forming a catalyst particle forming layer containing Si, Al, and Fe, and a step of performing a heat treatment on the catalyst particle forming layer in an atmosphere containing oxygen, to form catalyst particles containing Fe. The catalyst particles are held by the catalyst particle forming layer so that the catalyst particles are partially embedded in the catalyst particle forming layer. The size and the number of the catalyst particles containing (Continued)

Fe are controlled by adjusting the amount of oxygen contained in the atmosphere for the heat treatment. Thus, the catalyst particle-holding structure is formed easily.

5 Claims, 4 Drawing Sheets

(51) Int. Cl.
*B01J 37/08* (2006.01)
*B01J 23/745* (2006.01)
*B01J 21/18* (2006.01)
*B01J 37/02* (2006.01)
*B32B 1/08* (2006.01)
*B82Y 30/00* (2011.01)
*C01B 31/02* (2006.01)
*C22C 38/02* (2006.01)
*C22C 38/06* (2006.01)
*C01B 32/162* (2017.01)

(52) U.S. Cl.
CPC ........... *B01J 37/0207* (2013.01); *B01J 37/08* (2013.01); *B32B 1/08* (2013.01); *B82Y 30/00* (2013.01); *C01B 31/0233* (2013.01); *C01B 32/162* (2017.08); *C22C 38/02* (2013.01); *C22C 38/06* (2013.01)

(58) Field of Classification Search
CPC ......... C22C 38/02; C22C 38/06; C22C 21/02; B82Y 30/00; B82Y 40/00
USPC ......... 502/185; 420/537, 538, 578; 427/452, 427/456, 597; 977/742, 782
See application file for complete search history.

(56) References Cited

U.S. PATENT DOCUMENTS

| 8,029,760 | B2 * | 10/2011 | Kondo | B82Y 30/00 |
| | | | | 423/447.1 |
| 2003/0211029 | A1 | 11/2003 | Someya et al. | |
| 2005/0214197 | A1 | 9/2005 | Gu et al. | |
| 2008/0095695 | A1 | 4/2008 | Shanov et al. | |
| 2008/0299307 | A1 | 12/2008 | Ward et al. | |
| 2009/0108251 | A1 * | 4/2009 | Kabir | B82Y 10/00 |
| | | | | 257/14 |
| 2010/0284896 | A1 * | 11/2010 | Arendt | B82Y 30/00 |
| | | | | 423/447.2 |
| 2011/0064645 | A1 | 3/2011 | Ting et al. | |
| 2011/0107942 | A1 | 5/2011 | Eleto Da Silva et al. | |
| 2012/0301663 | A1 | 11/2012 | Koike et al. | |
| 2016/0247594 | A1 * | 8/2016 | Nakai | C08L 77/02 |

FOREIGN PATENT DOCUMENTS

| JP | 2010138033 | A | | 6/2010 | |
| JP | 2011092828 | A | | 5/2011 | |
| JP | 2012-091082 | | * | 5/2012 | ............ B01J 23/745 |
| JP | 2012091082 | A | | 5/2012 | |
| JP | 2015-212084 | | * | 11/2015 | ............ B01J 23/745 |
| TW | 200922871 | A | | 6/2009 | |

OTHER PUBLICATIONS

Wu, W., et al., "The effect of an Al underlayer on Fe—Si thin film catalysts for the improved growth of carbon nanotubes," Science Direct, Carbon 49 (2011) 4589-4594, copyright 2011 Elsevier Ltd.
De los Arcos, T., "Is aluminum a suitable buffer layer for carbon nanotube growth?" Science Direct, Chemical Physics Letters 380 (2003) 419-423, published online Oct. 7, 2003.
Office Action dated Sep. 14, 2018 issued in Taiwanese Patent Application No. 104126803.

* cited by examiner

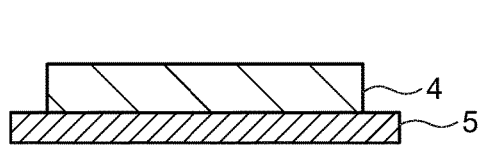
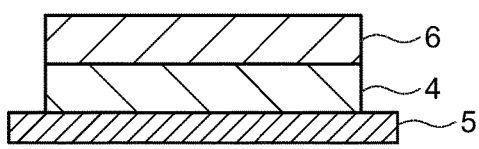
FIG. 2A  FIG. 2B
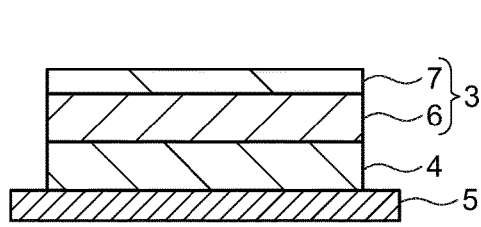
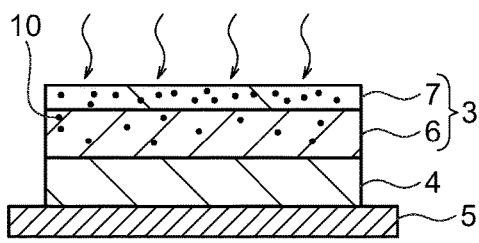
FIG. 2C  FIG. 2D

STRUCTURE FOR HOLDING CATALYST PARTICLES FOR CARBON NANOTUBE PRODUCTION AND METHOD FOR PRODUCING SAME

CROSS REFERENCE TO RELATED APPLICATION

The present application claims benefit of International Patent Application (PCT) No. PCT/JP2015/071517 filed on Jul. 29, 2015, which claims priority to Japanese Patent Application No. 2014-177265 filed on Sep. 1, 2014. Both of the above applications are incorporated herein by reference in their entirety.

TECHNICAL FIELD

The present invention relates to a structure holding catalyst particles used for production of carbon nanotubes, and a method for producing the same.

BACKGROUND ART

Carbon nanotube (hereinafter referred to as "CNT") has high heat and electrical conductivity, high corrosion resistance, and the like and has been attracting attention as a novel material.

The CNTs are produced as follows, for example: a layer containing a substance serving as a catalyst for generating the CNTs is formed on a substrate; a heat treatment is performed on the layer, to generate a large number of catalyst particles on the substrate; and gas serving as a raw material for the CNTs is supplied to the catalyst particles, to allow the CNTs to grow on the catalyst particles. In this production method, the catalyst particles move when the CNTs grow, and hence it is difficult for the CNTs to grow vertically with respect to the surface of the substrate. For this reason, development of a holding structure capable of holding catalyst particles on a substrate has been progressed.

Patent Literature 1 discloses a method for producing a holding structure, including the following steps: stacking an Al layer containing oxygen, a buffer layer made from Si, and a Fe layer in this order on a barrier layer formed on a surface of a substrate; then performing a heat treatment on the multilayer structure, to form a holding structure, in which fine Fe particles serving as catalyst particles are held by being partially embedded in the buffer layer.

CITATION LIST

Patent Literature

Patent Literature 1: Japanese Patent Laid-Open No. 2012-91082

SUMMARY OF INVENTION

Technical Problem

In the production method disclosed in Patent Literature 1, controlling the shape of the fine Fe particles necessitates controlling many items such as the amount of oxygen contained in the Al layer, the thickness of the Al layer, the thickness of the buffer layer, the thickness of the Fe layer, and conditions of the heat treatment. Thus, it has been difficult to produce the holding structure with a good yield.

An object of the present invention is to provide an easily producible catalyst particle-holding structure holding catalyst particles used for production of carbon nanotubes, and a method for producing the same.

Solution to Problem

A catalyst particle-holding structure used for production of carbon nanotubes of the present invention includes catalyst particles containing Fe, and a catalyst particle forming layer made of an alloy containing Al and Si. The catalyst particles are held by the catalyst particle forming layer so that the catalyst particles are partially embedded in the catalyst particle forming layer.

A catalyst particle holding structure used for production of carbon nanotubes of the present invention includes catalyst particles containing Fe, a catalyst particle forming layer containing Al and Si, and a barrier layer having a curved surface. The catalyst particle forming layer is disposed along the curved surface of the barrier layer. The catalyst particle forming layer so that the catalyst particles are partially embedded in the catalyst particle forming layer.

A method for producing a catalyst particle-holding structure used for production of carbon nanotubes of the present invention includes a step of forming a catalyst particle forming layer containing Si, Al, and Fe, and a step of performing a heat treatment on the catalyst particle forming layer in an atmosphere containing oxygen to form catalyst particles containing Fe. The catalyst particles are held by the catalyst particle forming layer so that the catalyst particles are partially embedded in the catalyst particle forming layer.

Advantageous Effects of Invention

The catalyst particle-holding structure used for production of carbon nanotubes of the present invention includes catalyst particles containing Fe, and a catalyst particle forming layer made of an alloy containing Al and Si. The catalyst particles are held by the catalyst particle forming layer so that the catalyst particles are partially embedded in the catalyst particle forming layer. Hence, the ratio of Al and Si is easily controlled when compared with a case where a catalyst particle forming layer is formed by stacking an Al layer and a Si layer. Thus, the catalyst particle-holding structure is easily produced by the production method of the present invention.

The catalyst particle-holding structure used for production of carbon nanotubes of the present invention includes catalyst particles containing Fe, a catalyst particle forming layer containing Al and Si, and a barrier layer having a curved surface. The catalyst particle forming layer is disposed along the curved surface of the barrier layer. The catalyst particles are held by the catalyst particle forming layer so that the catalyst particles are partially embedded in the catalyst particle forming layer. The catalyst particle forming layer is formed by a coating method. Accordingly, the catalyst particle forming layer is easily formed on a base having a curved surface. In the present catalyst particle-holding structure, the barrier layer and the catalyst particle forming layer are produced along the surface of a cylindrical base, and CNTs are formed on the catalyst particle-holding structure. Thus, the CNTs are produced more efficiently.

The method for producing a catalyst particle-structure used for production of carbon nanotubes of the present invention includes a step of forming a catalyst particle forming layer containing Si, Al, and Fe, and a step of performing a heat treatment on the catalyst particle forming layer in an atmosphere containing oxygen, to form catalyst particles containing Fe. The catalyst particles are held by the catalyst particle forming layer so that the catalyst particles are partially embedded in the catalyst particle forming layer. The size and the number of the catalyst particles containing Fe are controlled by adjusting the amount of oxygen containing in the atmosphere for the heat treatment, and as a result, the catalyst particle-holding structure is formed easily.

BRIEF DESCRIPTION OF DRAWINGS

FIG. 2 is a schematic view showing a production process of the body holding catalyst particles according to the first embodiment.

DESCRIPTION OF EMBODIMENTS

Hereinafter, embodiments of the present invention will be described in detail.

1. First Embodiment (1) Configuration

Figure 1:
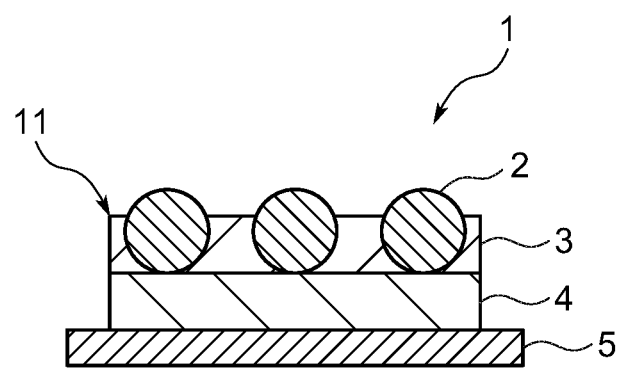
FIG. 1 is a schematic view showing a cross-section of a body holding catalyst particles according to a first embodiment.

As shown in FIG. 1, a body 1 holding catalyst particles includes a base 5 and a catalyst particle-holding structure (or holding structure) 11 holding catalyst particles. The base 5 is, for example, a plate-shaped member with a flat surface and made of Si (silicon). The base 5 may be made of metal such as Al (aluminum), or a metal oxide such as $Al_2O_3$ (alumina), $SiO_2$ (silica), MgO (magnesia), $TiO_2$ (titania) or $ZrO_2$ (zirconia). When the base 5 is made of a material, such as Al or $Al_2O_3$, that can be used for a below-explained barrier layer, the base 5 serves as a barrier layer. In such a case, it is not necessary to form a barrier layer 4.

The holding structure 11 is disposed on the base 5, and includes a barrier layer 4, a catalyst particle forming layer 3, and catalyst particles 2. The barrier layer 4 is disposed on the base 5. The barrier layer 4 is made of a metal oxide such as $Al_2O_3$, MgO, $TiO_2$ or $ZrO_2$, or metal such as Al, for example. The barrier layer 4 prevents the interaction between the catalyst particle forming layer 3 and the base 5. The barrier layer 4 may have any thickness as long as the barrier layer 4 prevents the interaction between the base 5 and the catalyst particle forming layer 3.

The catalyst particle forming layer 3 is made of an alloy containing Si and Al, and contains Al and Si at an atomic ratio in a range of 1:1 to 1:9. A portion of the after-mentioned Fe layer remains on the surface of the catalyst particle forming layer 3. The Fe layer on the surface of the catalyst particle forming layer 3 may disappear in a process of forming the after-mentioned catalyst particles 2, and may not remain on the surface. The catalyst particle forming layer 3 may contain iron silicide (or Fe-silicide), iron oxide, or oxide of Si or Al, which are generated in the process of forming the catalyst particles 2.

The catalyst particle forming layer 3 has the thickness in a range of 1 to 3 nm. The oxygen concentration of the catalyst particle forming layer 3 is highest at around the surface thereof. The oxygen concentration decreases with the depth of the catalyst particle forming layer 3.

The catalyst particles 2 have approximately spherical shapes, with the maximum diameter of 5 to 20 nm, and are disposed at certain intervals on the surface of the catalyst particle forming layer 3. The shape of the catalyst particle 2 is not limited to a sphere. The catalyst particle 2 may have an oval shape, a gourd-shape, or a polyhedron shape. The catalyst particle 2 may have a shape lacking a part of the above-described shape.

The catalyst particles 2 are disposed at the density of $10^9$ to $10^{12}$ particles/$cm^2$. The density of the catalyst particles 2 is calculated by measuring the number of the catalyst particles 2 in an image of the shape of the surface of the catalyst particle forming layer 3 observed under an atomic force microscope. Some portions of the catalyst particles 2 are embedded in the catalyst particle forming layer 3 while other portions of the catalyst particles 2 are exposed from the surface of the catalyst particle forming layer 3. In other words, the catalyst particles 2 are held by the catalyst particle forming layer 3, and are immobilized on the surface of the catalyst particle forming layer 3. A portion of the catalyst particle 2 is embedded in the catalyst particle forming layer 3 to such an extent that the catalyst particle 2 does not move on the surface of the catalyst particle forming layer 3. At least a portion of the catalyst particle 2 may be exposed from the surface of the catalyst particle forming layer.

The catalyst particles 2 contain Fe (iron). The catalyst particles 2 may be made of Fe or an alloy containing Fe and another metal. The catalyst particles 2 may contain other elements as impurities.

(2) Production Method

With reference to FIG. 2, a method for producing the body 1 holding catalyst particles will be described. First, the barrier layer 4 is formed on the base 5 by sputtering, chemical vapor deposition (CVD), or atomic layer deposition (ALD) (FIG. 2A).

Next, the alloy layer 6 having the thickness in a range of 1 to 3 nm is formed on the barrier layer 4 by sputtering or electron beam physical vapor deposition so that the atomic ratio of Al and Si in the alloy layer 6 is in a range of 1:1 to 1:9 (FIG. 2B). An alloy containing Si and Al, or two metals Si and Al may be used as a target of sputtering or as a raw material for vapor deposition, to produce the alloy layer 6.

Subsequently, a Fe layer 7 having the thickness of approximately 2 nm is formed by sputtering or electron beam vapor deposition on the alloy layer 6. Thus, the catalyst particle forming layer 3 is produced (FIG. 2C).

Finally, the base 5 over which the catalyst particle forming layer 3 has been produced is placed in an atmosphere containing oxygen, and a heat treatment is performed on the catalyst particle forming layer 3 for a predetermined period of time at a predetermined temperature (FIG. 2D). The heat treatment may be carried out in an atmosphere into which oxygen has been injected after evacuation, or in an atmosphere into which oxygen and inert gas such as Ar have been injected after evacuation.

During the heat treatment, oxygen 10 is diffused into the alloy layer 6 through the Fe layer 7, and Fe contained in the Fe layer 7 enters the alloy layer 6. Since Si cannot coexist with Fe in the alloy layer 6, the Fe in the alloy layer 6 agglomerates to form Fe particles. The Fe particles are exposed on the surface of the alloy layer 6. Of the Fe particles exposed on the surface, Fe particles having small diameters are deactivated by silicidation or absorbed into Fe particles having large diameters, or embedded in the alloy layer 6 again. As a result, on the surface of the catalyst particle forming layer, only the Fe particles having the maximum diameter in a range of 5 to 20 nm are exposed. Thus, the catalyst particles 2 held by the catalyst particle forming layer 3 are formed.

Through the aforementioned steps, the holding structure 11 shown in FIG. 1 is formed on the base 5 and the body 1 holding catalyst particles is obtained.

(3) Action and Effects

In a convention case where a catalyst particle forming layer has been formed by stacking an Al layer and a Si layer, the ratio of Al and Si containing in the catalyst particle forming layer has been controlled by adjusting the film thickness of the Al layer and the film thickness of the Si layer. However, since it has been difficult to regulate the thickness of the Al layer and the thickness of the Si layer, each of which is 10 nm or less, it has been difficult to control the ratio of Al and Si contained in the catalyst particle forming layer. Accordingly, it has been difficult to produce a holding structure with a good yield.

The catalyst particle-holding structure 11 of the present embodiment includes the catalyst particles 2 containing Fe and the catalyst particle forming layer 3 containing Al and Si. The catalyst particle forming layer 3 is made of an alloy containing Al and Si. The catalyst particles 2 are held by the catalyst particle forming layer 3 so that the catalyst particles are partially embedded in the catalyst particle forming layer.

Hence, the ratio of Al and Si contained in the catalyst particle forming layer in the holding structure 11 is easily controlled by adjusting (or changing) the ratio of Al and Si contained in the alloy, and the holding structure is produced with a good yield. Thus, the holding structure 11 is easily produced by the production method of the present invention.

The holding structure 11 with the catalyst particle forming layer 3 containing Al and Si at the ratio of 1:1 to 1:9 is produced with a better yield.

With the use of the holding structure 11 including the catalyst particles 2 disposed at the density of $10^9$ to $10^{12}$ particles/cm$^2$, a larger number of CNTs are produced efficiently at a time.

The method for producing the catalyst particle-holding structure 11 of the present embodiment includes a step of forming the alloy layer 6 of Al and Si on the barrier layer 4 and then forming the Fe layer 7 on the alloy layer 6, to produce the catalyst particle forming layer 3, and a step of performing a heat treatment on the catalyst particle forming layer 3 in an atmosphere containing oxygen, to form the catalyst particles 2 containing Fe. The catalyst particles 2 are held by the catalyst particle forming layer such that the catalyst particles 2 are partially embedded in the catalyst particle forming layer 3.

In the method for producing the holding structure 11, the size and the number of the catalyst particles containing Fe are controlled by adjusting (or changing) the concentration of oxygen in the atmosphere for the heat treatment, and thereby the catalyst particle-holding structure 11 is easily formed. In the method for producing the holding structure 11, the holding structure 11, which holds catalyst particles 2 at a high density, is easily formed by adjusting the concentration of oxygen in the atmosphere for the heat treatment.

2. Second Embodiment (1) Configuration

The body holding catalyst particles of a second embodiment is the same as the body holding catalyst particles of the first embodiment, with the exception that a part corresponding to the base 5 of the first embodiment has a cylindrical shape. Hence descriptions for the same configuration as that of the first embodiment will be omitted below.

Figure 3:
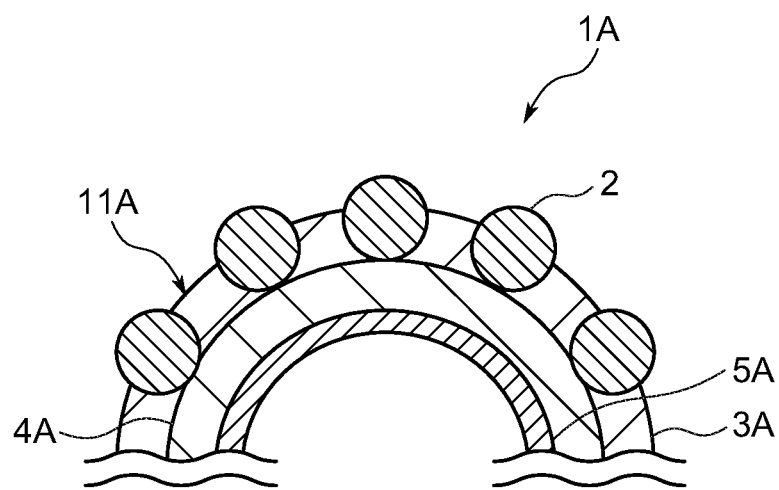
FIG. 3 is a schematic view showing a cross-section of a body holding catalyst particles according to a second embodiment.

As shown in FIG. 3, a body 1A holding catalyst particles includes a base 5A having a curved surface. In FIG. 3, a half of the base 5A is omitted, and the base 5A is illustrated as a member having a semicircular (arch-shaped) cross-section. Actually, the base 5A has a cylindrical shape. The shape of the cross-section of the base 5A may be triangular, rectangular, or polygonal. The base 5A may be a curved plate-shaped member. The base 5A may be a columnar-shaped member.

A holding structure 11A is disposed on the base 5A such that the holding structure 11A covers the outer surface of the base 5A. To be more specific, a barrier layer 4A is disposed along the surface of the base 5A, and a catalyst particle forming layer 3A is disposed along the surface of the barrier layer 4A. Hence, in the present embodiment, both of the barrier layer 4A and the catalyst particle forming layer 3A have cylindrical shapes. The catalyst particles 2 are held by the cylindrical catalyst particle forming layer 3A having the cylindrical shape.

(2) Production Method

A production method of the second embodiment is different from the production method of the first embodiment, only in a method of forming the barrier layer 4A and a method of forming the catalyst particle forming layer 3A, but the procedures other than those are the same. Hence, descriptions for the same procedures as those of the first embodiment will be omitted below.

First, a colloidal solution of aluminum hydroxide or an aluminum chloride solution is applied to the outer surface of the base 5A and then dried to form the barrier layer 4A along the surface of the base 5A.

Subsequently, the catalyst particle forming layer 3A is produced. The catalyst particle forming layer 3A is formed as follows. A colloidal solution of aluminum silicate is applied to the surface of the barrier layer 4A and then dried. Thereby an alloy layer including an alloy containing Si and Al is formed along the surface of the barrier layer 4A. Thereafter, a colloidal solution of iron hydroxide or an iron chloride solution is applied to the alloy layer and then dried. Thereby a Fe layer is formed along the surface of the alloy layer. Thus the catalyst particle forming layer 3A is formed.

Thereafter, a heat treatment is performed on the catalyst particle forming layer 3A for a predetermined period of time at a predetermined temperature in a vacuum atmosphere, to remove oxygen from the catalyst particle forming layer 3A.

The subsequent heat treatment step is the same as that of the first embodiment, and descriptions thereof will be omitted.

(3) Action and Effects

Similar to the first embodiment, the method for producing the catalyst particle-holding structure 11A of the present embodiment includes a step of forming the alloy layer containing Al and Si on the barrier layer 4A and then forming the Fe layer on the alloy layer, to produce the catalyst particle forming layer 3A, and a step of performing the heat treatment on the catalyst particle forming layer 3A in an atmosphere containing oxygen, to form the catalyst particles 2 containing Fe. The catalyst particles 2 are held by the catalyst particle forming layer such that the catalyst particles 2 are partially embedded in the catalyst particle forming layer 3A. Accordingly, the method for producing the catalyst particle-holding structure 11A of the present embodiment provides the same effects as those of the first embodiment.

The holding structure 11A includes the catalyst particles 2 containing Fe, the catalyst particle forming layer 3A containing Al and Si, and the barrier layer 4A having a curved surface. The catalyst particle forming layer 3A is formed along the surface of the barrier layer 4A. The catalyst particles 2 are held by the catalyst particle forming layer 3A so that the catalyst particles 2 are partially embedded in the catalyst particle forming layer 3A. The catalyst particle forming layer 3A is formed by a coating method. Thus, the catalyst particle forming layer 3A is easily produced on the base having the curved surface. The barrier layer 4A and the catalyst particle forming layer 3A of the holding structure 11A are formed along the surface of the cylindrical base 5A. With the use of the holding structure 11A, the CNTs are produced more efficiently.

3. Modified Embodiment

The present invention is not limited to the above-described embodiments, and may be modified within the scope of the present invention.

In the first embodiment, the alloy layer 6 of Al and Si is formed on the barrier layer 4, and then the Fe layer 7 is formed on the alloy layer 6. Thus the catalyst particle forming layer 3 is formed. The present invention is not limited to this embodiment. With the use of sputtering, electron beam vapor deposition or the like, a catalyst particle forming layer is produced by forming an Al layer (layer containing Al) with the thickness of 2 to 3 nm, a Si layer (layer containing Si) with the thickness of 5 to 7 nm, and a Fe layer (layer containing Fe) with the thickness of approximately 2 nm, in this order. The catalyst particle forming layer may be produced by forming the aforementioned Al layer on the barrier layer 4 and then forming an alloy layer containing Si and Fe with the thickness of 1 to 3 nm on the Al layer. The method for producing a catalyst particle forming layer is not particularly limited, as long as a heat treatment is performed on the catalyst particle forming layer in an atmosphere containing oxygen, after the production of the catalyst particle forming layer, to form the catalyst particles.

Figure 4:
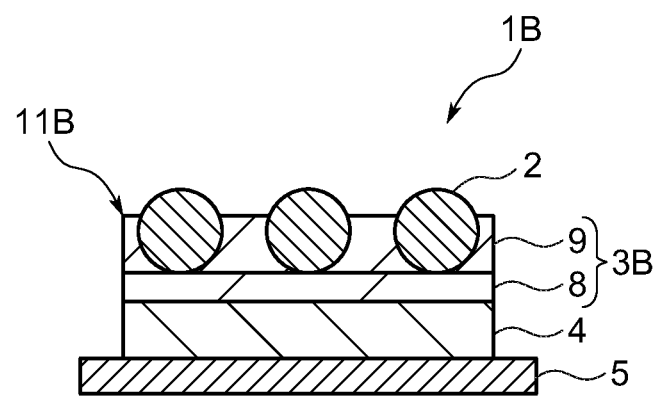
FIG. 4 is a schematic view showing a cross-section of a body holding catalyst particles according to a modified embodiment.

In FIG. 4, a body 1B holding catalyst particles includes the base 5, the barrier layer 4, and the catalyst particle forming layer 3B having a two-layer structure composed of an Al layer 8 and a Si layer 9. The catalyst particles 2 are held by the Si layer 9. A portion of the Si layer 9 close to the interface between the Si layer 9 and the Al layer 8 contains Al.

In the above-described second embodiment, the alloy layer containing Al and Si is formed on the barrier layer 4A and then the Fe layer is formed on the alloy layer, to produce the catalyst particle forming layer 3A. The present invention is not limited to this embodiment. A colloidal solution of Al hydroxide or Al chloride may be applied to the barrier layer and then dried to form an Al layer. Thereafter, a colloidal solution of Si hydroxide or Si chloride may be applied to the Al layer and then dried to form a Si layer. Thus a catalyst particle forming layer is produced. The method for producing a catalyst particle forming layer is not particularly limited, as long as a heat treatment is performed on the catalyst particle forming layer in an atmosphere containing oxygen after the production of the catalyst particle forming layer.

The above-described embodiments describe the catalyst particle-holding structure 11A formed on the base 5A having the curved surface and the catalyst particle-holding structure 11 formed on the base 5 having the flat surface. The present invention is not limited to them. The base 5 may be spherical or particulate, or a member having uneven surface.

In a case where the catalyst particles 2 are formed from an alloy containing Fe at a predetermined ratio, the alloy layer containing Fe at the predetermined ratio may be formed instead of the Fe layer 7.

Examples

The structure holding catalyst particles of the present invention was produced, and TEM micrographs of the cross-section of the holding structure were taken with a transmission electron microscope (TEM). The holding structure was evaluated using the TEM micrographs.

Figure 5:
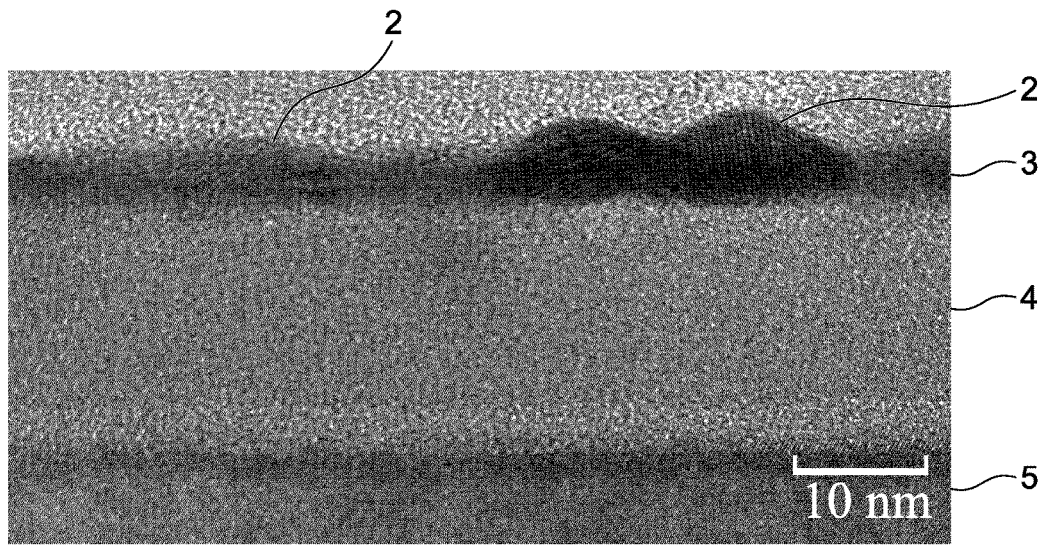
FIG. 5 is a transmission electron micrograph showing a cross-section of the structure holding catalyst particles of the present invention.

FIG. 5 shows a TEM micrograph of a holding structure produced by performing a heat treatment on the catalyst particle forming layer in an atmosphere containing oxygen. The catalyst particle forming layer 3 is formed on the barrier layer 4. The catalyst particle forming layer 3 is formed with the catalyst particles 2, and some portions of the catalyst particles 2 are exposed from the surface of the catalyst particle forming layer 3.

Figure 6:
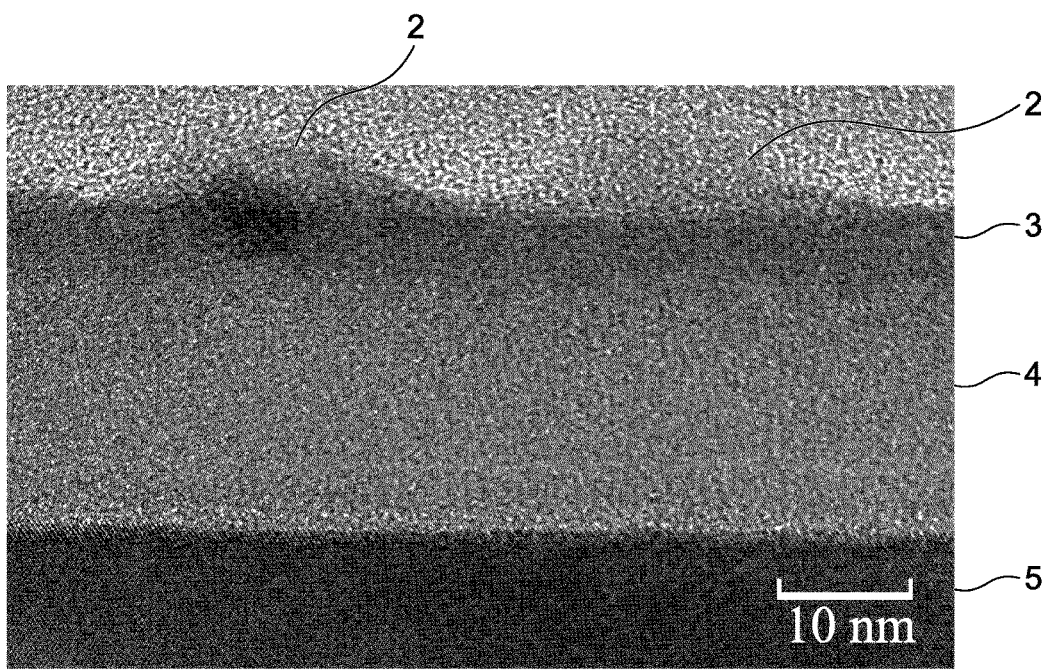
FIG. 6 is a transmission electron micrograph showing a cross-section of the structure holding catalyst particles of the present invention.

FIG. 6 shows a TEM micrograph of a holding structure produced by performing a heat treatment on a catalyst particle forming layer in an atmosphere containing oxygen. Similar to the holding structure shown in FIG. 5, the catalyst particle forming layer 3 is formed on the barrier layer 4. The catalyst particle forming layer 3 is formed with the catalyst particles 2, and some portions of the catalyst particles 2 are exposed from the surface of the catalyst particle forming layer 3.

From the above-described results, it was confirmed that the catalyst particles are held by the catalyst particle forming layer such that the catalyst particles are partially embedded in the catalyst particle forming layer. It was also confirmed that the holding structure of the present invention was produced by performing the heat treatment on the catalyst particle forming layer in the atmosphere containing oxygen.

REFERENCE SIGNS LIST 1 body holding catalyst particles
2 catalyst particle
3 catalyst particle forming layer
4, 4A barrier layer
5, 5A base
6 alloy layer
7 Fe layer
8 Al layer
9 Si layer
11, 11A, 11B holding structure

The invention claimed is:

1. A catalyst particle-holding structure used for production of carbon nanotubes, comprising:
catalyst particles containing Fe; and
a catalyst particle forming layer made of an alloy containing Al and Si, the catalyst particles being held by the catalyst particle forming layer so that the catalyst particles are partially embedded in the catalyst particle forming layer;

wherein the catalyst particle forming layer contains the Al and the Si at a ratio of 1:1 to 1:9.

2. The catalyst particle-holding structure according to claim 1, further including a barrier layer, the catalyst particle forming layer being disposed on the barrier layer.

3. The catalyst particle-holding structure according to claim 1, wherein the catalyst particle-holding structure is disposed on a plate-shaped base.

4. A catalyst particle-holding structure used for production of carbon nanotubes, comprising:
catalyst particles containing Fe; and
a catalyst particle forming layer made of an alloy containing Al and Si, the catalyst particles being held by the catalyst particle forming layer so that the catalyst particles are partially embedded in the catalyst particle forming layer,
wherein the catalyst particles are disposed at a density of $10^9$ to $10^{12}$ particles/cm$^2$.

5. A catalyst particle-holding structure used for production of carbon nanotubes, comprising:
catalyst particles containing Fe;
a catalyst particle forming layer containing Al and Si; and
a barrier layer having a curved surface,
wherein the catalyst particle forming layer is disposed along the curved surface of the barrier layer, and
the catalyst particles are held by the catalyst particle forming layer so that the catalyst particles are partially embedded in the catalyst particle forming layer.

* * * * *